United States Patent [19]

Sarugaku et al.

[11] Patent Number: 5,363,474
[45] Date of Patent: Nov. 8, 1994

[54] EMERGENCY SHUTDOWN SYSTEM FOR CONTROLLING INDUSTRIAL ROBOT

[75] Inventors: Shinichi Sarugaku, Funabashi; Toru Kurenuma, Ibaraki; Takeshi Andoh, Yachiyo; Masami Otomo, Funabashi; Kyoichi Kawasaki, Sakura, all of Japan

[73] Assignee: Hitachi Construction Machinery Co., Ltd., Tokyo, Japan

[21] Appl. No.: 30,291

[22] PCT Filed: May 14, 1992

[86] PCT No.: PCT/JP92/00616

§ 371 Date: Mar. 18, 1993

§ 102(e) Date: Mar. 18, 1993

[87] PCT Pub. No.: WO92/21076

PCT Pub. Date: Nov. 26, 1992

[30] Foreign Application Priority Data

May 21, 1991 [JP] Japan ................... 3-144035

[51] Int. Cl.⁵ .............................. G06F 15/00
[52] U.S. Cl. ........................... 395/91; 395/95
[58] Field of Search ............ 395/90, 91, 95, 93

[56] References Cited

U.S. PATENT DOCUMENTS

| | | | |
|---|---|---|---|
| 3,251,483 | 5/1966 | Devol | 395/95 |
| 4,068,156 | 1/1978 | Johnson et al. | 395/95 |
| 4,132,318 | 1/1979 | Werner | 395/95 |
| 4,243,923 | 1/1981 | Whitney et al. | 395/95 |
| 4,278,920 | 7/1981 | Ruoff, Jr. | 395/95 |
| 4,298,308 | 11/1981 | Richter | 395/95 |
| 4,367,532 | 1/1983 | Crum et al. | 395/95 |
| 4,408,286 | 10/1983 | Kikuchi et al. | 395/95 |
| 4,715,773 | 12/1987 | Parker et al. | 395/95 |
| 4,807,153 | 2/1989 | Onaga et al. | 395/91 |
| 5,231,693 | 7/1993 | Backes et al. | 395/84 |

FOREIGN PATENT DOCUMENTS

| | | |
|---|---|---|
| 60-29292 | 2/1985 | Japan . |
| 63-204302 | 8/1988 | Japan . |
| 63-278778 | 11/1988 | Japan . |
| 3-55195 | 3/1991 | Japan . |

*Primary Examiner*—Allen R. MacDonald
*Attorney, Agent, or Firm*—Wegner, Cantor, Mueller & Player

[57] ABSTRACT

A system for controlling an industrial robot, which is simplified in operation and capable of direct-teaching safely all the time. The system is provided with means (131 and 132) for monitoring a magnitude of an external force applied to the forward end of a hand during direct teaching, so that the motion of the robot can be forcibly restricted when the external force reaches a predetermined value of thereabove. Furthermore, when the system is operated to be set in a direct teach mode, a process (136) of correcting the offset of a force sensor is performed automatically. By monitoring a force detected by the force sensor, the discrimination is made as to whether an external force to operate the robot at an abnormal speed is applied to the robot or not, and when the external force becomes higher than a reference value, a mode of prohibiting the operation of the robot by the external force (position control mode) is set, or current supplied to a servo motor is cut off to prevent the robot from going into the erroneous operation due to an erroneous control.

7 Claims, 7 Drawing Sheets

EMERGENCY SHUTDOWN SYSTEM FOR CONTROLLING INDUSTRIAL ROBOT

FIELD OF THE INVENTION:

The present invention relates to a direct teaching type industrial robot.

DESCRIPTION OF RELATED ART

A typical industrial robot is a teaching regenerative type robot to which a series of operations is taught by guiding the main body (manipulator) of the robot to a target position to cause it to memorize such position, and as methods for guiding the main body of such robot, there are a method of guiding indirectly by control buttons and a joystick and a direct teaching method of guiding directly by an operator by directly leading the forward end of a hand of the main body of the robot manually.

By the way, in the prior art examples of the direct teaching type robot, the robot is guided by an external force by restricting a current for a drive motor as described in Japanese Patent Laid-open Nos. 63-57185 and 63-57186.

Further, as a method for correctly measuring a force applied to the forward end of the hand of the robot, a method of eliminating a drift (offset) of a force sensor is known as described in Japanese Patent Laid-open Nos. 62-114891 and 62-114892.

In the prior art examples described above, however, no consideration is given as to how to deal with an erroneous operation of the operator and accordingly, there exists a problem that when a large robot is erroneously guided in the direction of gravity and the like, the motion of the robot exceeds and reaches to an unexpected position, causing a very dangerous situation.

Furthermore, when a force applied to the forward end of the hand is to be directly detected by a force sensor, an offset of the force sensor has to be adequately removed. In the prior art examples however, no consideration is given to such timing, causing a problem that a large burden is imposed on the operator.

Accordingly, it is an object of the present invention to provide a system for controlling a robot, which allows direct teaching safely all the time.

SUMMARY OF THE INVENTION

In order to achieve the aforementioned object, the system is provided with means for monitoring a magnitude of an external force applied to the forward end of a hand during direct teaching, so that the motion of the robot can be forcibly restricted when the external force reaches a predetermined value of thereabove.

Furthermore, when the system is operated to be set in a direct teach mode, a process for correcting the offset of the force sensor is performed automatically.

The force sensor is mounted at the forward end of the hand of the robot to detect an external force all the time. By monitoring a force detected by the force sensor, the discrimination is made as to whether an external force to operate the robot at an abnormal speed is applied to the robot or not, and when the external force becomes greater than a reference value, a mode of prohibiting the operation of the robot by the external force (position control mode) is set, or current supplied to a servo motor is cut off to prevent the robot from going into the erroneous operation due to an erroneous control.

The direct teach may be realized by simple operations by adapting a key for specifying the direct teach mode to perform each individual processing at a moment when its switch is pressed, during being pressed down and at a moment when it is released.

DETAILED DESCRIPTION OF THE PREFERRED EMBODIMENTS

Figure 1:
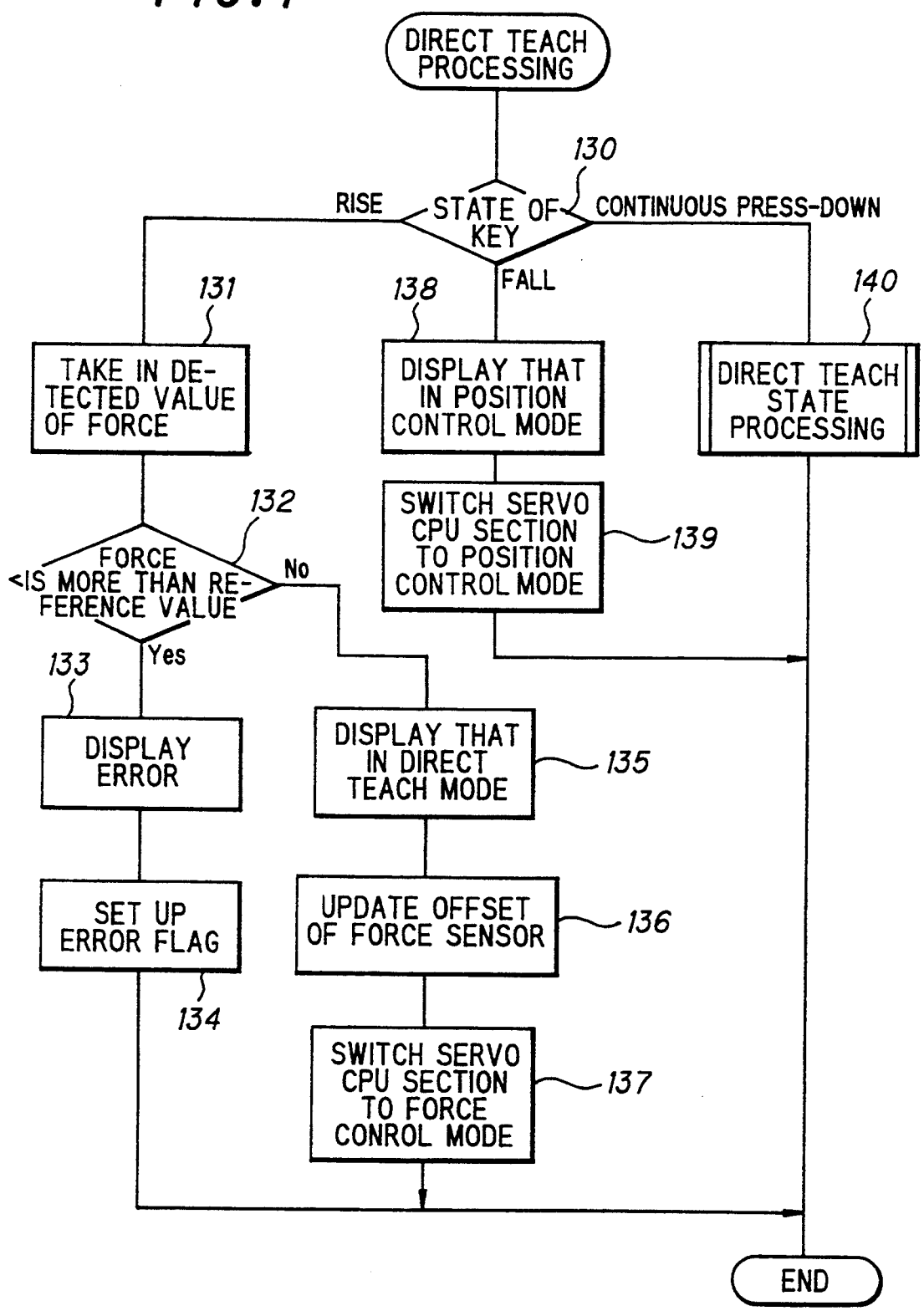
FIG. 1 is a flowchart illustrating a direct teach processing according to one embodiment of the present invention.

Referring now to the drawings, preferred embodiments of the system for controlling an industrial robot according to the present invention will be explained in detail.

Figure 3:
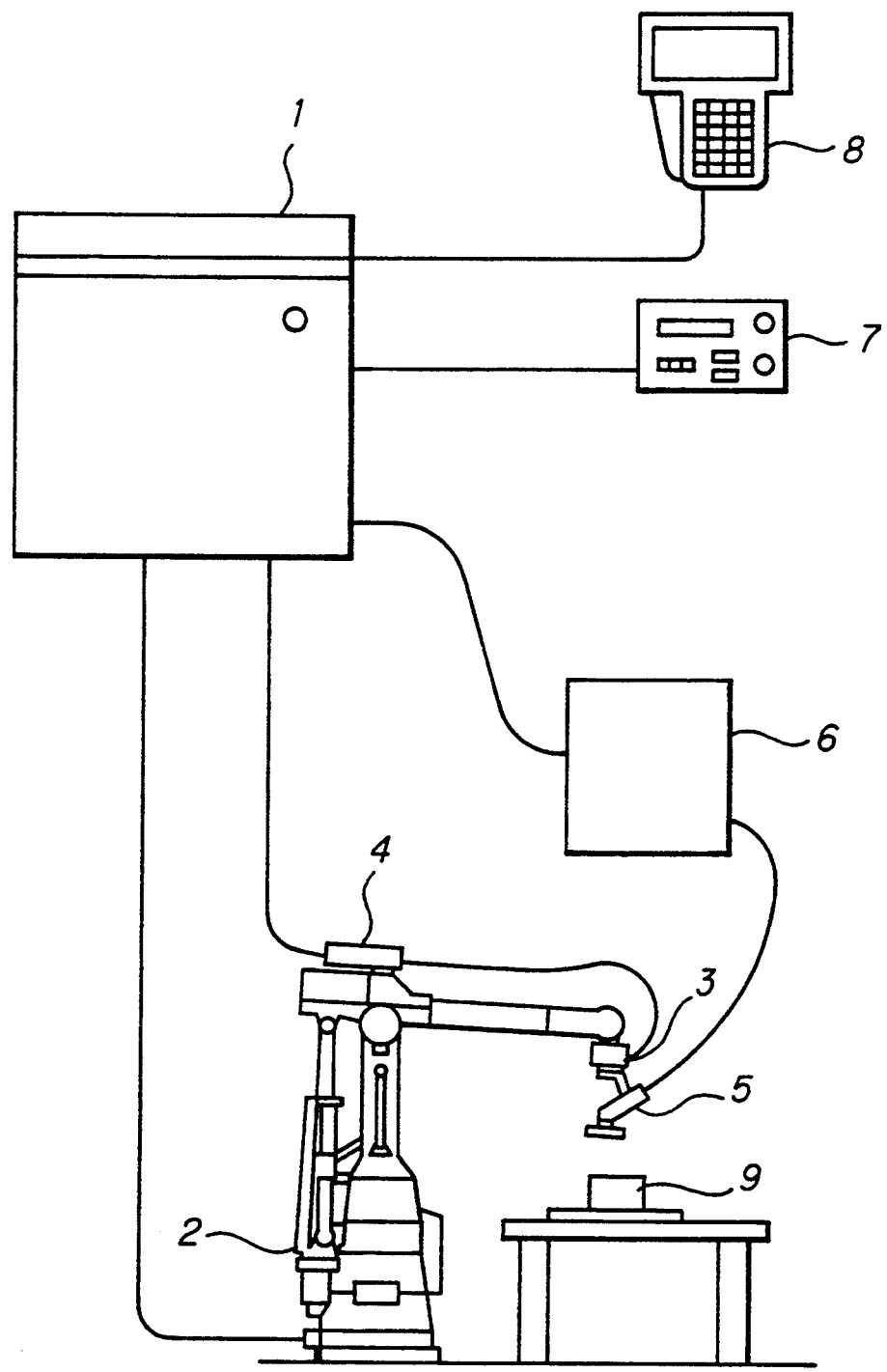
FIG. 3 is a schematic drawing illustrating a structure of the whole system of one embodiment of the present invention.

FIG. 3 is a drawing illustrating a structure of the whole system of one embodiment when the present invention is applied to a grinder machining robot, wherein a robot controller system 1 controls all the units and carries out the main processing of the present invention. A main body 2 of the robot (manipulator) has six axes each of which is driven by a servo motor in this embodiment. A force sensor 3 is provided six strain gages within it to detect forces in x, y and z directions and moments around x axis, y axis and z axis. A relay box 4 for the force sensor converts detected signals from the force sensor 3 into digital signals to send to the robot controller 1 by serial communication. The relay box 4 allows a signal line between the main body 2 and the controller 1 to be resistant against noise, so that they can be disposed separating quite a distance apart from each other. A grinder (grinding machine) 5 grinds a workpiece 9. A grinder controller 6 operates the grinder 5 by signals from the robot controller 1. A playback console (PBC) 7 is provided with switches for switching modes of the robot and switches for starting and stopping automatic operation and the like. A programming unit (PGU) 8 is provided with key switches such as a direct teach key and deadman switch key and with a liquid crystal display (LCD). The PGU 8 is used to teach operations to the robot.

Figure 4:
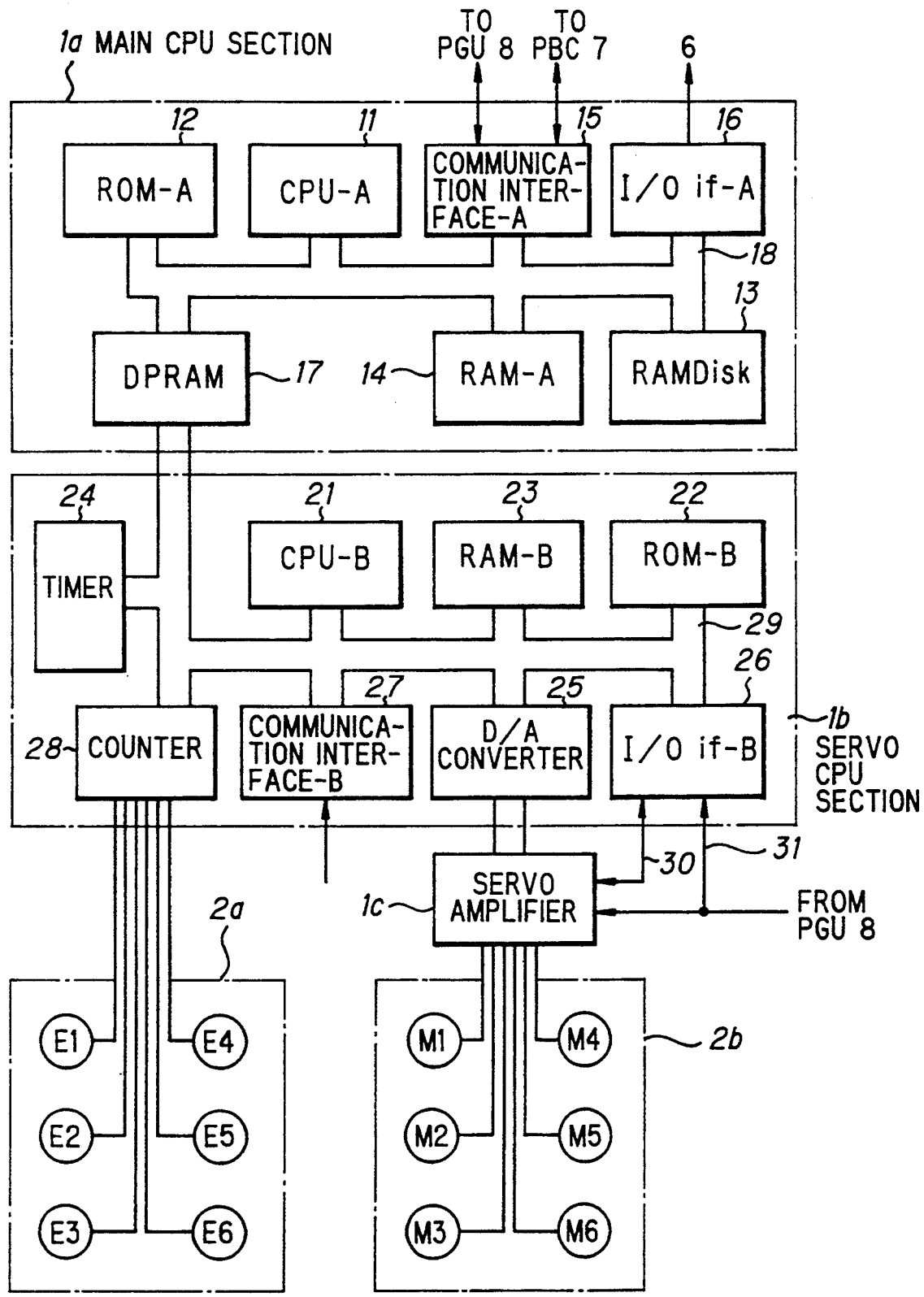
FIG. 4 is a block diagram illustrating an internal hardware of the unit (1) in FIG. 3.

Referring now to FIG. 4, the inside of the robot controller 1 and the main body 2 will be explained.

The inside of the robot controller 1 is roughly divided into three parts, wherein a main CPU section 1a performs a man-machine interface, interlocking process for safety, sequence control during automatic operation and the like. It also performs the main processing of the present invention. A servo CPU section 1b controls operations of the robot and processes signals from the force sensor. A servo amplifier 1c will be described later in detail.

Next, each part will be explained in detail. CPU-A 11 in the main CPU section 1a controls each unit based on programs written in ROMs and RAMs. ROM-A 12 stores an initialization program which the CPU-A 11 executes when power is turned ON. RAM Disk 13 and RAM-A 14 store processing programs, except of the initialization, to be executed by the CPU-A 11, various flags and intermediate results of computations. The processing programs are loaded from the RAM Disk 13 to the RAM-A 14 when the power is turned ON by the initialization program in the ROM-A 12. The RAM Disk 13 is battery-backed up so that the contents therein will not be lost even when the power is turned off.

The CPU-A 11 exchanges information with the PBC 7 and PGU 8 through the intermediary of a communication interface A 15. An input/output interface A 16 is connected with the grinder controller 6. A dual port RAM 17 is used for exchanging information between the main CPU section 1a and the servo CPU section 1b. A bus A 18 connects each of the devices described above.

A CPU-B 21 in the servo CPU section 1b controls operations of the robot by signals from the force sensor 3. A ROM-B 22 stores processing programs executed by the CPU-B 21. A RAM-B 23 temporarily stores intermediate results of computations. A timer 24 interrupts the CPU-B 21 in every predetermined time. (sampling period).

An input/output interface B 26 is connected with an emergency stop signal line 31 from the PGU 8 and a signal line 30 for turning servo ON/OFF so that the CPU-B 21 is able to give a direction to the servo amplifier 1c whether to supply driving current to the six servo motors (servo ON state) or not to supply (servo OFF state) using the signal line 30. The emergency stop signal line 31 is also connected to the servo amplifier 1c, so that when the signal is turned OFF, the servo is unconditionally turned into servo OFF state.

The CPU-B 21 gives a direction to the servo amplifier 1c through a D/A converter 25 as to how much of driving current should be supplied to each servo motor.

A counter 28 is connected with encoders (E1 through E6) which are mounted on the servo motor on each axis of the main body, so that the CPU-B 21 is able to known current value (operation angle) of each axis of the robot by reading the values of the counter 28.

The CPU-B 21 receives detected values of force provided from the force sensor 3 through the intermediary of the relay box 4 via a communication interface B 27. A bus B 29 connects each of the devices within the servo CPU section.

Six amplifiers are included in the servo amplifier 1c to generate currents for driving six motors M1 through M6 in a motor section 2b of the robot.

An encoder section 2a contains encoders E1 through E6 each of which is mounted on each of the motor M1 through M6. Each motor M1 through M6 and each encoder E1 through E6 are mounted respectively on a swivel axis, upper arm axis, front arm axis, turning axis, bending axis and twisting axis of the manipulator.

Figure 5:
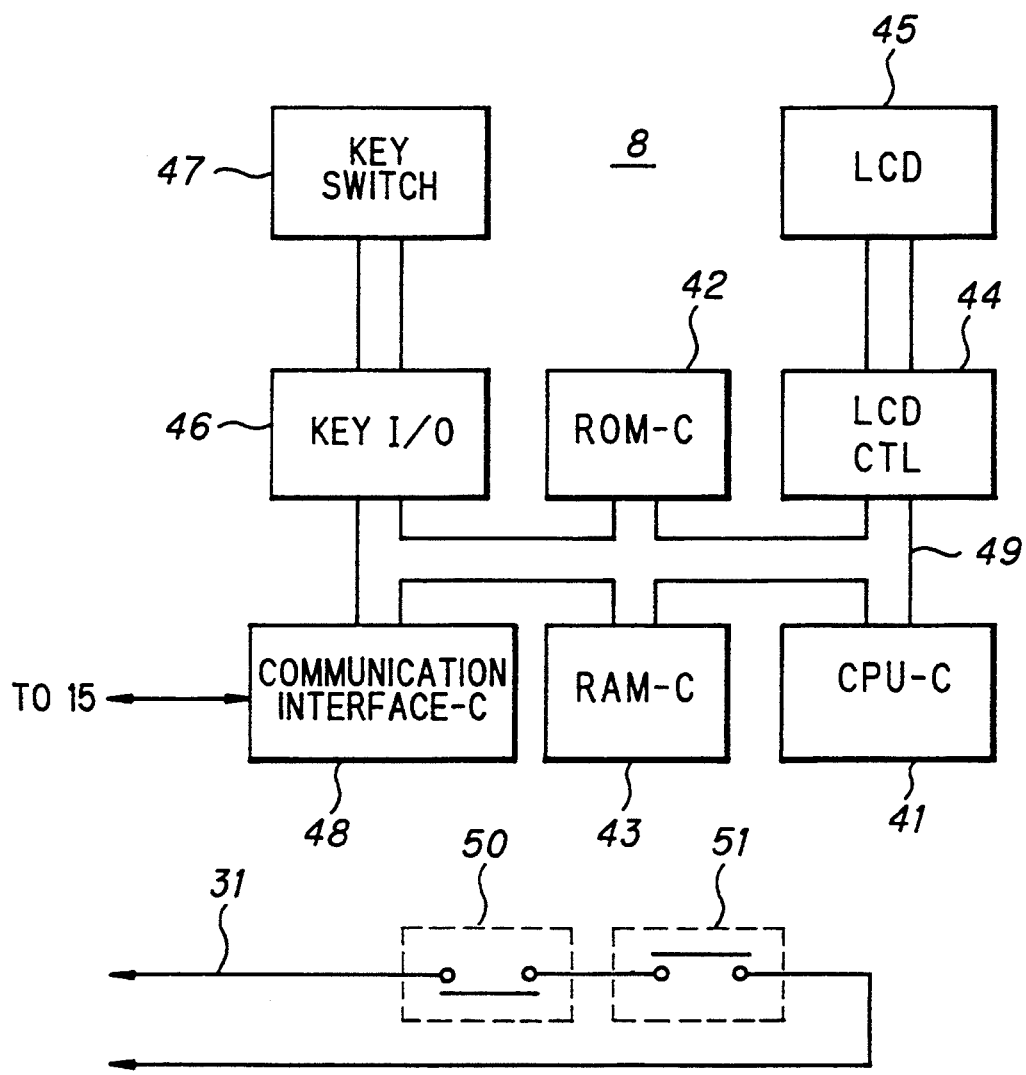
FIG. 5 is a block diagram illustrating an internal hardware of the unit (8) in FIG. 3.

Referring now to FIG. 5, a structure of the internal hardware blocks of the PGU 8 will be explained. This PGU 8 is used when teaching operations to the robot.

In FIG. 5, a CPU-C 41 executes all processing required in the PGU 8. A ROM-C 42 stores programs processed by the CPU-C 41. A RAM-C 43 temporarily stores data that appears in a processing process of the CPU-C 41. A LCD controller 44 and liquid crystal display (LCD) 45 display letters and figures. The CPU-C 41 displays necessary messages to the LCD 45 through the LCD controller 44.

A key switch panel 47 is provided with a direct teach key and numeral keys therein, and the CPU-C 41 is able to detect state of each key through the intermediary of a key I/O 46. The CPU-C 41 receives messages to be displayed from the robot controller 1 through a communication interface C 48 and displays it on the LCD 45. The CPU-C 41 monitors states of the key switch 47 also through the intermediary of the communication interface C48. It notices to the robot controller 1 a rise when the key is pressed, a fall when it is released and a continuous pressed-down state when it is continuously pressed down. A bus C 49 connects each of the devices within the PGU 8.

An emergency stop switch 50 turns the signal line 31 into OFF state when it is pressed down and on the other hand, a deadman switch 51 keeps the signal line 31 in ON state only during when it is pressed down. Accordingly, the main body of the robot is possible to be in servo ON state and is operable only when the emergency stop switch 50 is not pressed and the deadman switch 51 is ON. The deadman switch 51 is mounted on the back of the PGU 8 so that when the PGU 8 is held by the left hand, the deadman switch 51 may be pressed (to be ON) by another finger while pressing the direct teach key by the thumb.

Next, actual processing of those described above will be explained one by one.

Figure 7:
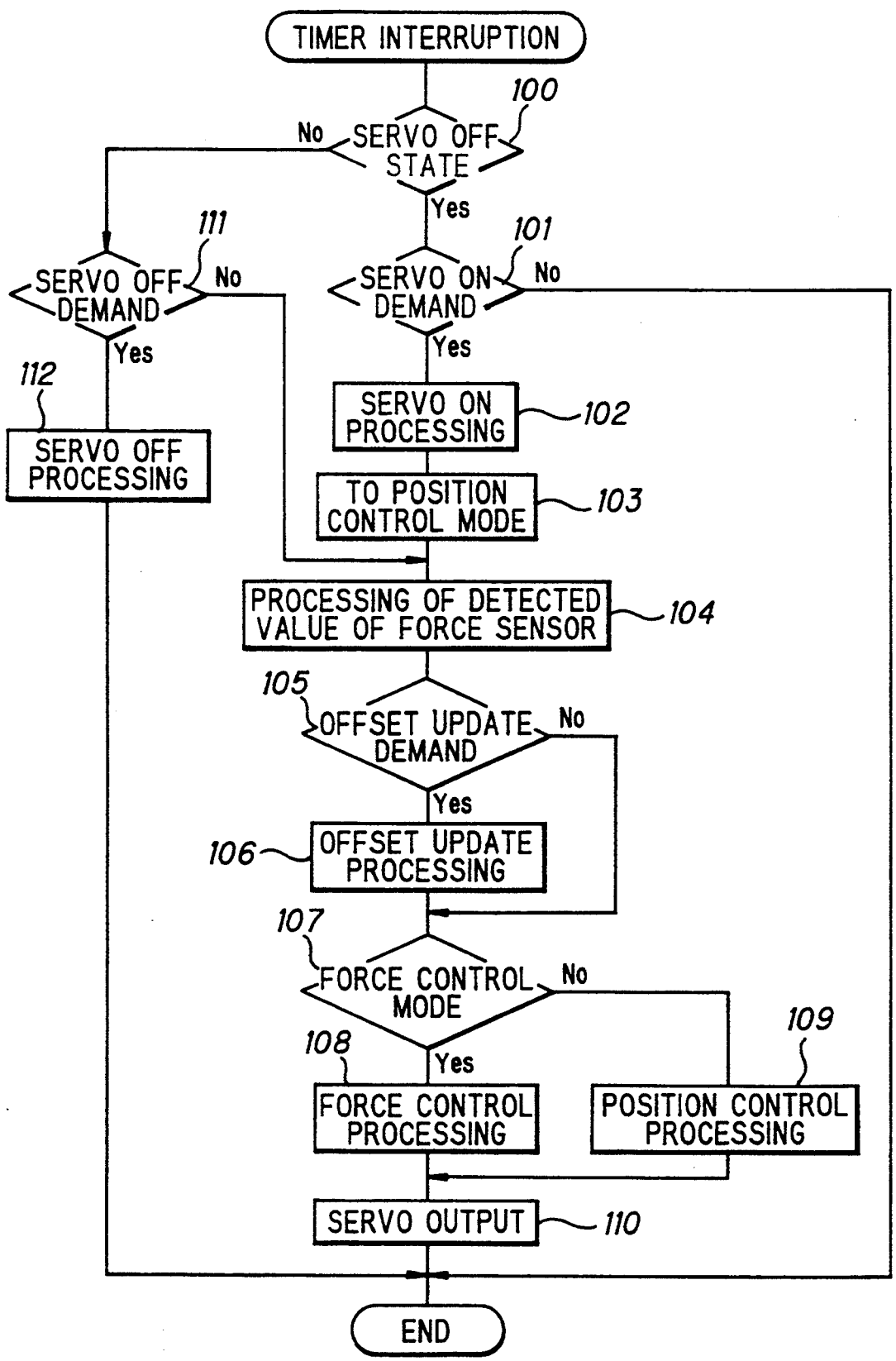
FIG. 7 is a flowchart of a timer interrupt processing.

FIG. 7 is a flowchart showing a content processed in the servo CPU section 1b. The servo CPU section 1b performs the processing shown in FIG. 7 every time when interruption occurs from the timer 24. At first, a state of the servo amplifier 1c is checked in step 100. If it is servo OFF state, it is checked whether a servo ON demand has come from the main CPU section 1a or not in step 101. If the servo ON demand has not come, the processing is ended.

If the servo ON demand has come, servo ON processing is carried out in step 102. In step 102, current values of the robot are read from the encoders E1 through E6, each parameter within the robot is initialized and then servo ON is commanded to the servo amplifier 1c. Next, the control mode of the servo CPU section 1b is switched to the position control mode in step 103. This is done to prevent the main body of the robot from starting to move erroneously by the offset and others of the force sensor at the moment when the servo is turned ON. In step 104, the servo CPU section 1b receives detected value of a force from the force sensor 3 through communication and performs coordinate conversions for converting working points of the force, gravity compensation of the tools and offset processing.

$$F = M(F^*) \tag{1}$$

$$F = F - G - F\text{off} \tag{2}$$

$$F^* = (fx^*, fy^*, fz^*, Mx^*, My^*, Mz^*)$$

$$F = (fx, fy, fz, Mx, My, Mz)$$

where,
$F^*$: detected value of the force sensor
$F$ = magnitude of force at the working point of the force represented by a base coordinate system of the robot M: coordinate conversion function
G: compensated value of the force sensor by weight of the tool
Foff: offset of the force sensor
F: value of true force Here Equation (1) represents the coordinate conversions and Equation (2) represents the gravity compensation and offset processing. This offset processing is carried out to compensate temperature drift and others of the strain gages used for the force sensor.

In step 104, the value of F is noticed also to the main CPU section. In step 105, it is checked whether an update demand of the offset has come from the main CPU section and if it has come, an offset update processing is carried out in step 106. The offset update processing is carried out assuming that no external force is applied to the force sensor, as in Equation (3):

$$Foff = F - G \tag{3}$$

The symbols are the same with those used in Equations (1) and (2). The value of Foff found in this manner is stored in the RAM-B 23.

In step 107, it is checked whether the control state is force control mode or not. The control state is decided by a direction of the main CPU section 1a, except of a moment when servo is switched to ON. If the control state is the force control mode, a force control processing is carried out in step 108. Parameters given from the main CPU section 1a determine what kind of control is to be carried out in the force control processing. For example, parameters set during direct teach decide current value of each servo motor so that the robot operates with a velocity proportional to a detected value F of a force.

When it is not the force control mode, a position control processing is carried out in step 109. In this case, current value of each servo motor is determined so that the robot operates to a position directed from the main CPU section 1a and the current value of each motor determined is output to the D/A converter 25 in step 110.

On the other hand, if it was not the servo OFF state in step 100 in the beginning, it is checked whether a servo OFF demand has come from the main CPU section 1a or not in step 111. If it has come, the servo OFF processing is carried out in step 112 and it has not come, the processing after step 104 is carried out.

Next, the processing carried out in the main CPU section 1a will be explained. Either a teach mode or automatic operation mode may be selected in the main CPU section 1a by a mode switching switch. The operations in the teach mode will be explained hereinafter.

Figure 6:
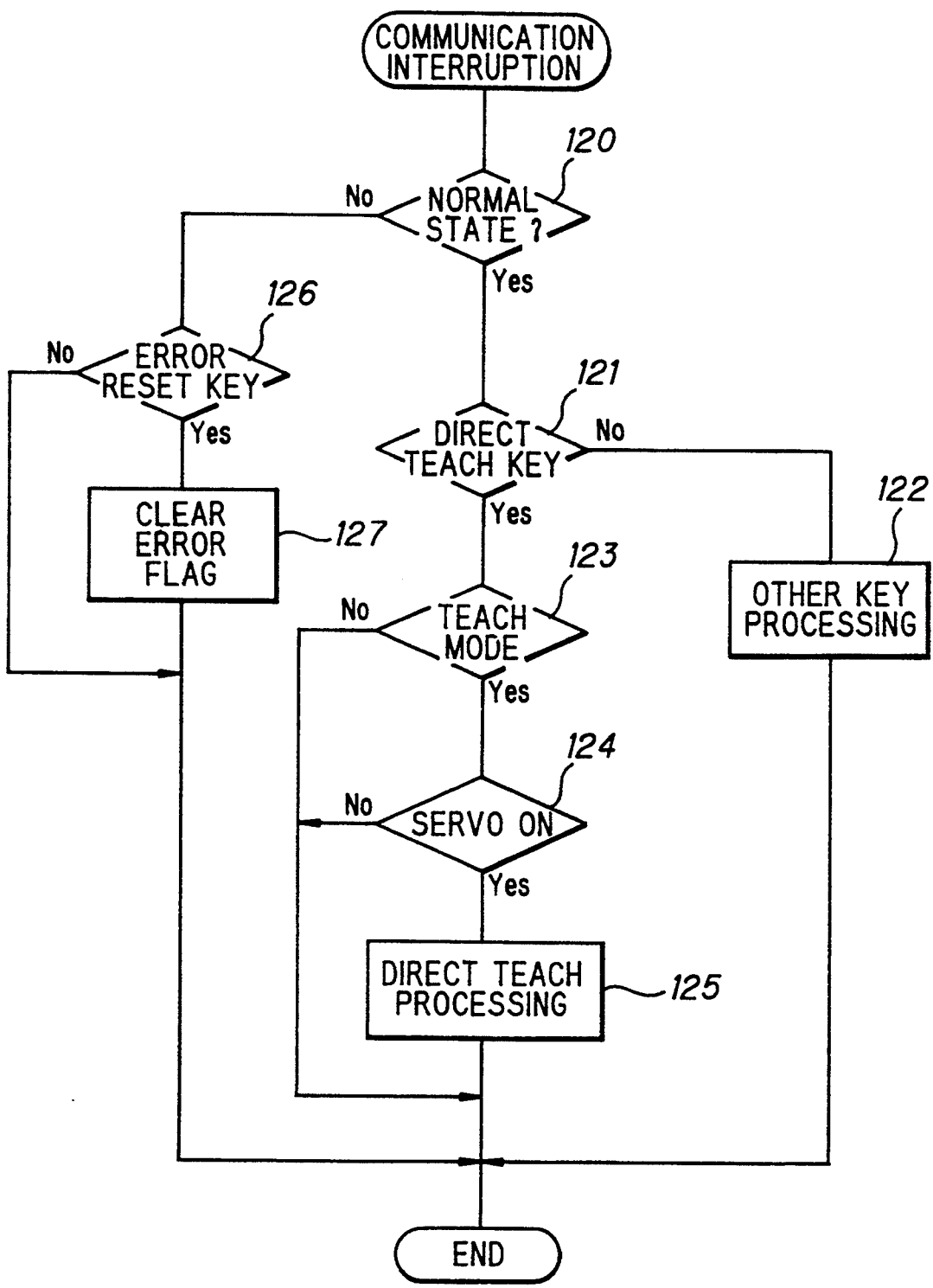
FIG. 6 is a flowchart of a communication interrupt processing.

FIG. 6 is a flowchart illustrating a communication interrupt processing from the PGU 8 in the main CPU section 1a, in which this communication interrupt processing is activated when the PGU 8 detects a state of the key switch and notices it to the section 1a.

In step 120 at first, it is checked whether it is an error state or a normal state. It is determined to be error state when an error flag is set up and to be normal state when no error flag is set up. If it is a normal state, a discrimination is made as to whether the notice from the PGU 8 is that of the direct teach key or not in step 121. It is a key other than the direct teach key, the processing of the other key is carried out in step 122. If it is the direct teach key, the current mode is checked in step 123 and if it is in the automatic operation mode, the procedure ends without processing anything.

It is in the teach mode, a discrimination is made as to whether it is during servo ON or not. If it is during servo OFF, the procedure ends without processing anything. If it is during servo ON, the direct teach process is carried out in step 125. The direct teach processing will be explained later in detail.

If it was determined to be error state in step 120, the notice from the PGU 8 is determined whether it was that of an error reset key or not in step 126, and if it was that of the error reset key, the error flag is cleared in step 127.

Referring now to FIG. 1, the direct teach processing will be explained. At first, a state of the direct teach key is determined in step 130. If it is a rise, the detected value F of the force sensor is taken in from the servo CPU section 1b in step 131. Then a discrimination is made whether the detected value of the force exceeds a reference value or not in step 132. The discrimination is made by the following equations:

$$fx^2 + fy^2 + fz^2 > fo^2 \tag{4}$$

$$Mx^2 + My^2 + Mz^2 > Mo^2 \tag{5}$$

where F = (fx, fy, fz, Mx, My, Mz) and fo and Mo are reference values (constants).

If either one of Equation 4 or 5 is fulfilled, the force is determined to exceed the reference value.

By the way, in the present embodiment, fo and Mo are set to be:

$$fo = 2kgW = 18.6N$$

$$Mo = 0.2kgWm = 1.86Nm$$

When the force is determined to exceed the reference values, the error is displayed on the LCD of the PGU 8 in step 133 and an error flag is successively set up in step 134.

If the force is less than the reference value, the LCD of the PGU 8 is caused to display that it is in the midst of direct teach and then an offset update of the force sensor is demanded to the servo CPU section 1b in step 136. When the offset update is completed, force control parameters for direct teach are set in the servo CPU section 1b in step 137 and the servo CPU section 1b is switched to the force control mode.

The process described above causes an error if one tries to enter the direct teach state while applying a force to the forward end of the hand of the robot. Further, the detected value of the force F becomes zero by the offset update process in any time when it becomes the direct teach state, so that the robot will not suddenly start to move.

Then, when it is determined to be a fall of the direct teach key, the LCD of the PGU 8 is caused to display that a position is being controlled in step 138 and then the servo CPU section 1b is switched to the position control mode in step 139.

When the state of the direct teach key is that of continuously pressed down, the direct teach state processing is carried out in step 140. The PGU 8 is adapted to issue a notice of continuously pressed down continuously in any number of times while the key is kept pressed down.

Figure 2:
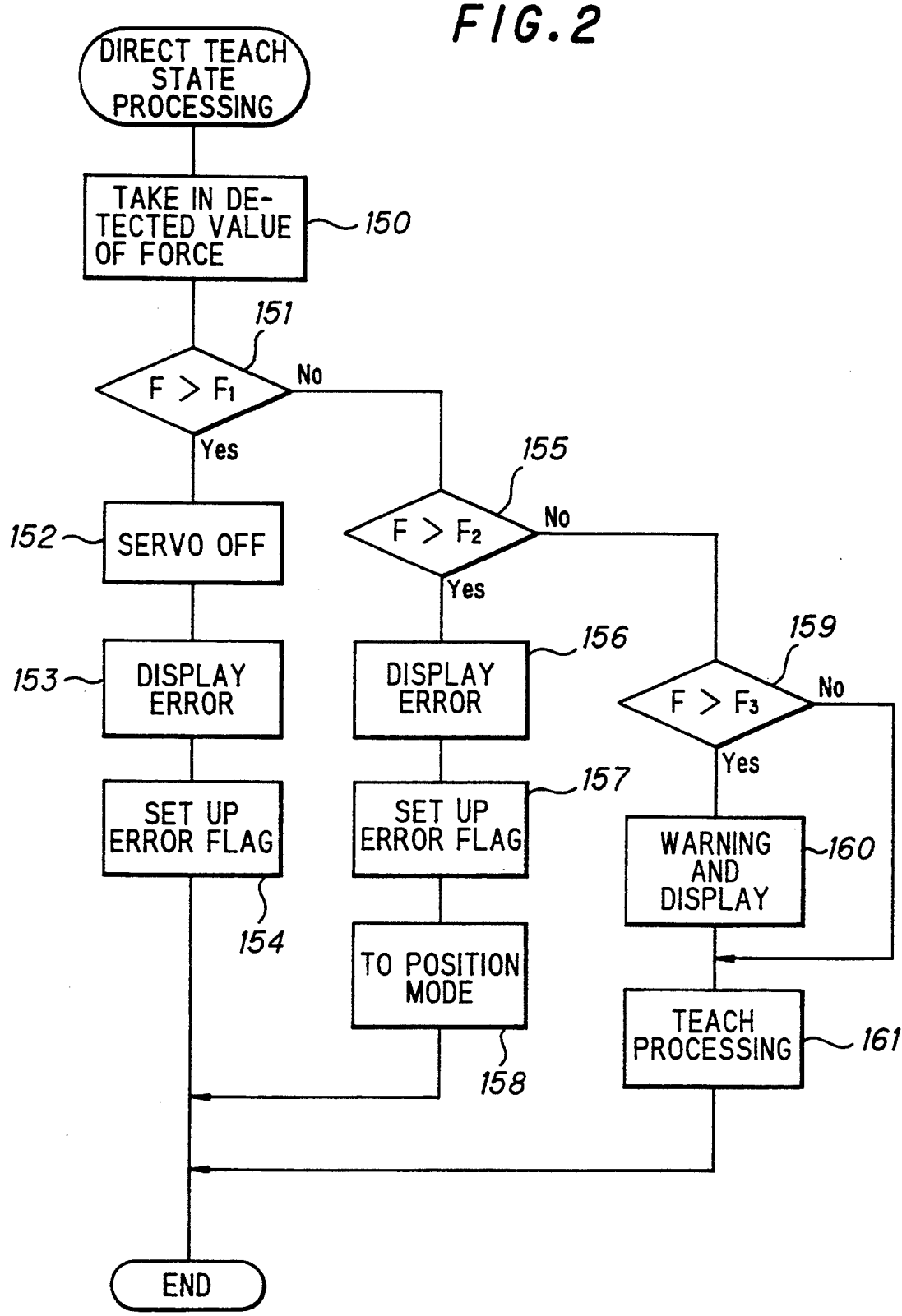
FIG. 2 is a flowchart illustrating a processing of direct teach state.

FIG. 2 is a flowchart of the direct teach state processing, wherein the detected value F of a force is taken in from the servo CPU section 1b in step 150 at first. Then in step 151, a discrimination is made as to whether the detected value F of the force exceeds the emergency stop reference value by the following equations:

$$fx^2+fy^2+fz^2>f1^2 \quad (6)$$

$$Mx^2+My^2+Mz^2>M1^2 \quad (7)$$

In the present embodiment, f1 and M1 are set to be as follows:

$$f1=20kgW=186N$$

$$M1=2kgWm=18.6Nm$$

When the force exceeds the emergency stop reference values, a servo OFF demand is issued to the servo CPU section 1b in step 152, the LCD of the PGU 8 is caused to display an error in step 153 and an error flag is set up in step 154 to end the processing.

When the force has not exceeded the emergency stop reference value in step 151, a discrimination is made as to whether the force exceeds an error reference value or not in step 155 by the following equations:

$$fx^2+fy^2+fz^2>f2^2 \quad (8)$$

$$Mx^2+My^2+Mz^2>M2^2 \quad (9)$$

In the present embodiment, f2 and M2 are set to be as follows:

$$f2=10kgW=98N$$

$$M2=1kgWm=9.8Nm$$

If either one of Equations (8) or (9) is fulfilled, the LCD of the PGU 8 is caused to display an error in step 156 and an error flag is set up in step 157. Then the servo CPU section 1b is switched to the position control mode in step 158 to end the processing.

On the other hand, when the force has not exceeded the error reference value in step 155, a discrimination is made in step 159 whether the force exceeds an warning reference value by the following equations:

$$fx^2+fy^2+fz^2>f3^2 \quad (10)$$

$$Mx^2+My^2+Mz^2>M3^2 \quad (11)$$

In the present embodiment, f3 and M3 are set to be as follows:

$$f3=5kgW=49N$$

$$M3=0.5kgWm=4.9Nm$$

When the force exceeds the warning reference value, the LCD of the PGU 8 is caused to display an warning for a certain period of time in step 160. Although the LCD is caused to display an warning in the present embodiment, it is possible to warn by a buzzer. Then the teach processing is carried out in step 161.

According to the present embodiment, therefore, the processing described above allows the operator to teach operations to the robot safely all the time when directly guiding the forward end of the hand of the robot in the direct teach mode.

The effects of the present embodiment may be summarized as follows:

(1) The robot can be guided in both modes of the position control (indirect control) and force control (direct control) and be guided using the direct teach in a range where the operator can reach by hands and by control buttons in another range, so that one can readily teach operations to the robot.

(2) The mode is switched always to the position control mode when the servo is turned ON, so that the robot will not be operated erroneously by an erroneous detected value of force at the moment when the servo is turned ON.

(3) Switching to the direct teach mode is carried out only when a force applied to the forward end of the hand of the robot is less a predetermined value, so that it is possible to prevent the robot from suddenly starting to move and injuring the operator at the moment when it enters the direct teach mode.

(4) An offset update processing of the force sensor is automatically carried out when it enters the direct teach mode, so that the operator needs not to pay his attention to temperature drift and others of the force sensor. Furthermore, it is safe since the robot is always stopping at the moment when it enters the direct teach mode.

(5) Servo is turned OFF when a large force is applied to the force sensor, so that it will not injure the operator by erroneous operation.

(6) It causes an error when a force more than a predetermined value is applied to the force sensor, so that the guiding speed of the robot is restricted to less than a certain speed and hence it is safe.

(7) It enters in the direct teach mode only during when the direct teach key is pressed, so that the control is easy.

(8) The signal from the force sensor is digital signal, so that it is more resistant against noise than analog signal.

Industrial Applicability

According to the present invention, a magnitude of an external force applied to the forward end of the hand of the robot is monitored during direct teach and the move of the robot is forcibly suppressed when the external force exceeds a predetermined value, so that the main body of the robot will not move when the robot is to be operated by a large force erroneously. Accordingly, it is possible to assuredly prevent a possibility that the grip and others of the robot is driven to an unexpected position by its force from occurring and to teach the robot safely all the time .

What is claimed is:

1. A system for controlling an industrial robot comprising:
sensor means for detecting an amount of external force applied to a forward end of a moving part of a main body of said robot;
means for controlling a driving force of the main body in accordance with the amount of external force detected by said sensor means, said means for controlling having a normal position control mode and a direct teach control mode; and
emergency cut-off means for cutting-off the supply of the driving force to the main body of said robot to stop the main body in an emergency when the amount of said external force exceeds a preset reference value.

2. The system for controlling an industrial robot according to claim 1, further comprising speed restricting means for restricting the moving speed of the forward end of the moving part of the main body of said robot to a preset speed value so that a speed control can be effected during operation of the direct teach control mode.

3. A system for controlling an industrial robot comprising:

sensor means for detecting an amount of external force applied to a forward end of a moving part of a main body of said robot;

means for controlling a driving force of the main body in accordance with the amount of external force detected by said sensor means, said means for controlling having a normal position control mode and direct teach control mode; and warning display means for displaying a warning when the amount of said external force exceeds a preset reference value.

4. The system for controlling an industrial robot according to claim 3, further comprising speed restricting means for restricting the moving speed of the forward end of the moving part of the main body of said robot to a preset speed value so that a speed control can be effected during operation of the direct teach control mode.

5. A system for controlling an industrial robot comprising:

sensor means for detecting an amount of external force applied to a forward end of a moving part of a main body of said robot;

means for controlling a driving force of the main body in accordance with the amount of external force detected by said sensor means, said means for controlling having a normal position control mode and a direct teach control mode; and direct teach control mode reset means for resetting said direct teach control mode when the amount of said external force exceeds a preset reference value.

6. The system for controlling an industrial robot according to claim 5, wherein speed restricting means for previously setting a maximum value of moving speed of the forward end of the moving part of the main body to suppress it to a certain limited speed value so that a speed control by this speed restricting means is effected in the direct teach control state.

7. A system for controlling an industrial robot comprising:

sensor means for detecting an amount of external force applied to a forward end of a moving part of a main body of said robot;

means for controlling a driving force of the main body in accordance with the amount of external force detected by said sensor means, said means for controlling having a normal position control mode and a direct teach control mode; and offset correcting means for correcting an offset of said sensor means when the control mode of the robot is switched from said normal position control modes to said direct teach control mode.

* * * * *